Aug. 28, 1951  R. C. MANN ET AL  2,565,868
INSPECTION UNIT FOR BATTERY SEPARATOR PLATES
Filed Oct. 27, 1947  3 Sheets-Sheet 1

INVENTORS:
WILLIAM H. ASHCRAFT
BY RALPH C. MANN

AGENT.

Aug. 28, 1951   R. C. MANN ET AL   2,565,868
INSPECTION UNIT FOR BATTERY SEPARATOR PLATES
Filed Oct. 27, 1947   3 Sheets-Sheet 2
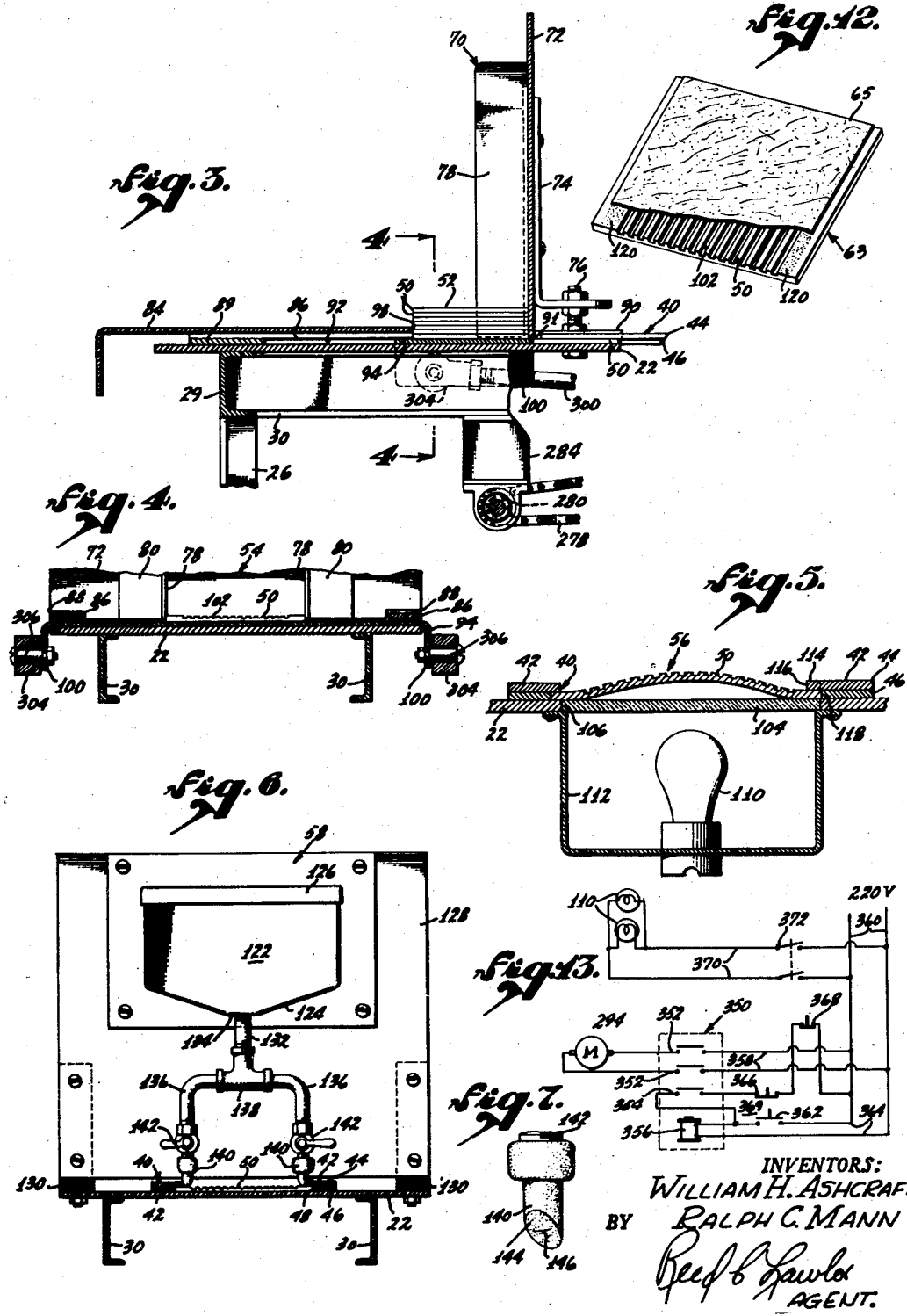
INVENTORS:
WILLIAM H. ASHCRAFT
RALPH C. MANN
BY
Reed & Lawlor
AGENT.

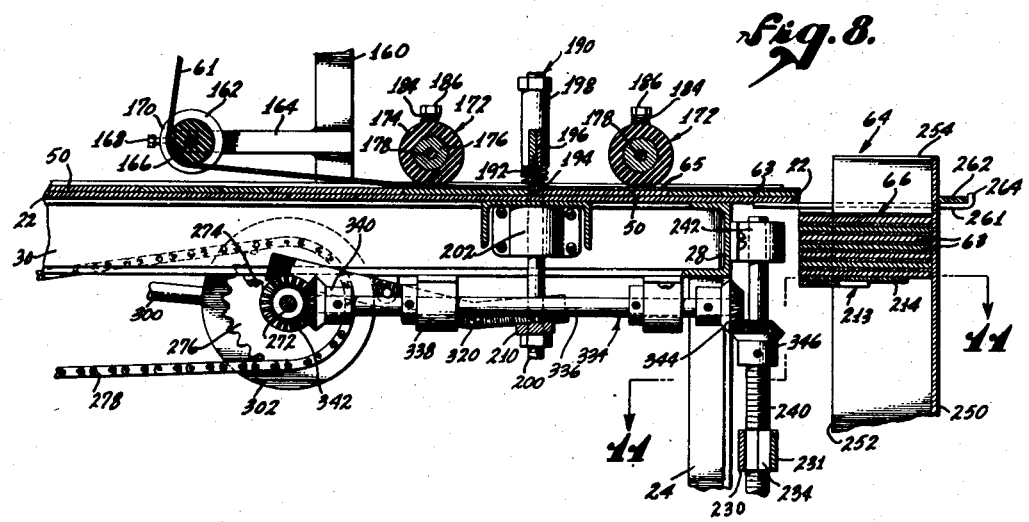
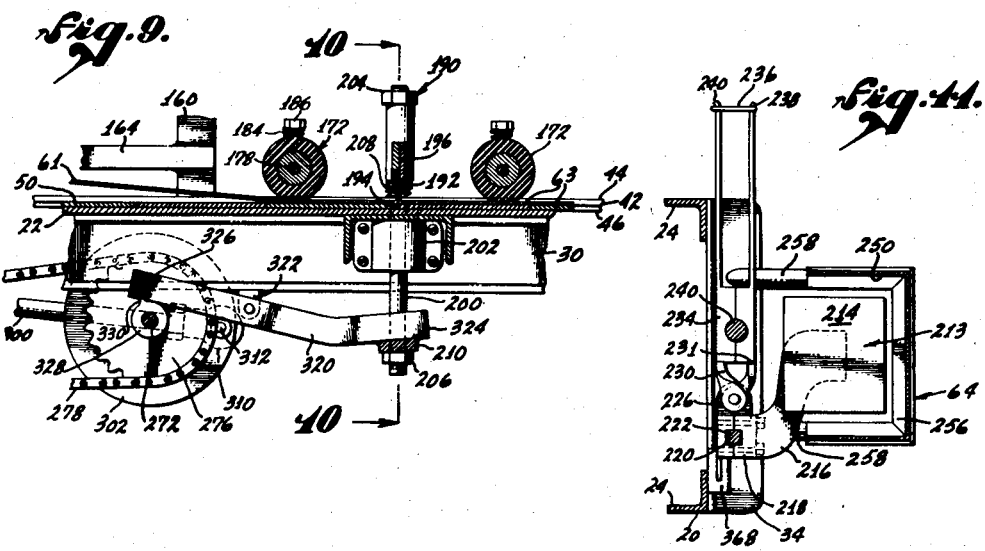
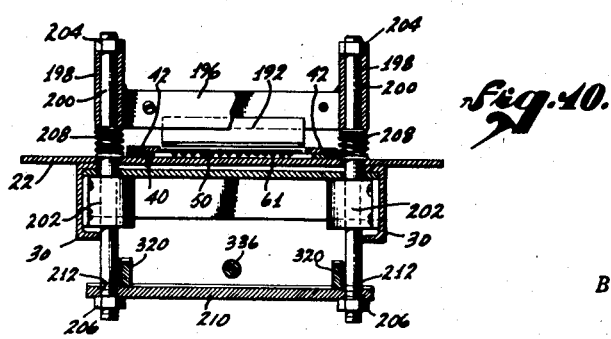

Patented Aug. 28, 1951

2,565,868

UNITED STATES PATENT OFFICE 2,565,868

INSPECTION UNIT FOR BATTERY SEPARATOR PLATES

Ralph C. Mann, Van Nuys, and William H. Ashcraft, Glendale, Calif., assignors to James Anderson, Jr., Los Angeles, Calif.

Application October 27, 1947, Serial No. 782,254

1 Claim. (Cl. 88—14)

Our invention relates to improvements in the method of manufacturing separator units for storage batteries and to machinery for automatically carrying out our improved method.

In multiple plate storage batteries, separators are conventionally used between successive pairs of positive and negative battery plates. Such separators serve to space the battery plates apart in order to avoid short-circuiting adjacent plates. Separators which are extensively used for this purpose are in the form of plates made of treated wood. These separator plates are usually grooved on one face to form ribs which face the positive battery plates and which form passages which facilitate the circulation of electrolyte in the battery. In order to retain active material on the positive battery plates efficiently, sheets of fiber glass are often positioned between the ribbed surface of each separator plate and the adjacent positive battery plate. The inclusion of such individual sheets of fiber glass in the assembly of a battery increases the cost of manufacture considerably.

Attempts have been made to simplify the assembly of batteries employing such sheets by forming separator units which include sheets of matted fiber glass attached to the ribbed sides of such separator plates. In the past, such separator units have been made by cutting sheets of the fiber glass to the size of the ribbed separator plates with which they are to be used and then gluing the two together. The high cost of manufacture of such separator units has rendered their use uneconomical except for special purposes where long battery life is desired regardless of cost.

An object of our invention is to provide an improved method for making such separator units.

Another object of our invention is to provide a method utilizing a rolled strip of porous sheet material for making such separator units.

Another object of our invention is to provide automatic machinery for forming such separator units from a stack of separator plates and a rolled strip of such porous material.

A further object is to provide a feeder which forms a series of separator plates and which intermittently advances the plates along a track in such automatic machinery.

A further object of our invention is to provide an improved apparatus for candling separator plates, especially in the operation of such automatic machinery.

A further object of our invention is to provide a gluing device by means of which adhesive may be automatically applied to the sides of separator plates advanced through such automatic machinery.

A still further object of our invention is to provide an arrangement for drawing a strip of porous sheet material from a roll and to press it onto a series of separator plates to which adhesive has been applied.

A still further object of our invention is to provide a cutter which automatically cuts such a strip between adjacent separator plates after it has been secured thereto.

A still further object of our invention is to provide a stacker including an elevator in which the completed separator units are stacked automatically during the operation of the machine.

And still a further object of our invention is to provide such automatic machinery in which the operation of the feeder, the cutter, and the elevator are synchronized.

Our invention possesses numerous other objects and features of advantage, some of which, together with the foregoing, will be set forth in the following description of specific apparatus embodying and utilizing our novel method. It is, therefore, to be understood that our method is applicable to other apparatus, and that we do not limit ourselves, in any way, to the apparatus of the present specification, as we may adopt various other apparatus embodiments, utilizing the method, within the scope of the appended claim.

In the drawings, wherein like numerals represent the same parts in the several views:

Fig. 3 is a sectional view of the feeder viewed on the plane taken on the line 3—3 of Fig. 2;

Fig. 4 is a sectional view of the feeder viewed on the plane taken on the line 4—4 of Fig. 3;

Fig. 5 is a vertical section of the inspection stage viewed on the plane taken on the line 5—5 of Fig. 2;

Fig. 6 is a front view of the gluing device viewed on the plane taken on the line 6—6 of Fig. 1;

Fig. 7 is an oblique rear isometric view of a glue spreader of the gluing device;

Fig. 8 is a fragmentary vertical section viewed on the plane taken on the line 8—8 of Fig. 2, showing a portion of the gluing system, the cutter, and a portion of the stacker;

Fig. 9 is a similar fragmentary sectional view illustrating the mechanism for operating the cutter;

Fig. 10 is a rear sectional view of the cutter viewed on the plane taken on the line 10—10 of Fig. 9;

Fig. 11 is a top view of the stacker viewed on the surface taken on the line 11—11 of Fig. 8;

Fig. 12 is a partially fragmentary isometric view of a complete battery separator unit; and Fig. 13 is a schematic wiring diagram of the control circuit employed with the automatic machinery illustrated.

I. General

Our invention comprises forming a series of separator plates in end-to-end relation, securing a strip of porous material to a plurality of successive plates in the series, and then cutting the strip between successive plates to form the separator units desired. More particularly, ribbed plates are utilized and the plates are arranged with the ribs aligned and with adjacent ends of the successive plates in contact. This series of plates is advanced along a predetermined path and a strip of the porous material is withdrawn from a roll thereof supported adjacent the path. As the series of separator plates advances, successive portions of the strip are pressed flat onto successive plates in the series and secured thereto. In order to secure the strip to the plates, adhesive such as glue is flowed onto the plates on the outer edges of the ribbed faces thereof as they advance into the position where the strip is pressed onto them. The strip is then cut between adjacent ends of pairs of successive plates in order to form the individual separator units.

In the particular automatic machinery which we have developed for carrying out the method of our invention, separator plates are successively forced from the bottom of a stack of such plates to form a series of plates which are then automatically advanced along a track, first passing a candling device where they may be visually inspected and defective plates removed. After progressing through the candling device, adhesive is automatically applied to the plates and then a strip of the porous material at the end of the roll is pressed by a roller against the plates bearing the adhesive. As the separator plates are moved beneath the roller and the strip secured thereto, the strip is automatically drawn from the roll solely by virtue of its attachment to the plates. After passing beyond the roller the strip is then cut automatically between the adjacent edges of successive plates to which they are glued and the severed separator units so formed are automatically stacked. In the particular form of machinery which we have developed for this purpose, the series of separator plates is advanced along the track by the new plates intermittently added to the series, thus periodically moving the series on the track and periodically holding it stationary thereon, and the strip is cut while the series of plates is stationary.

Figure 1:
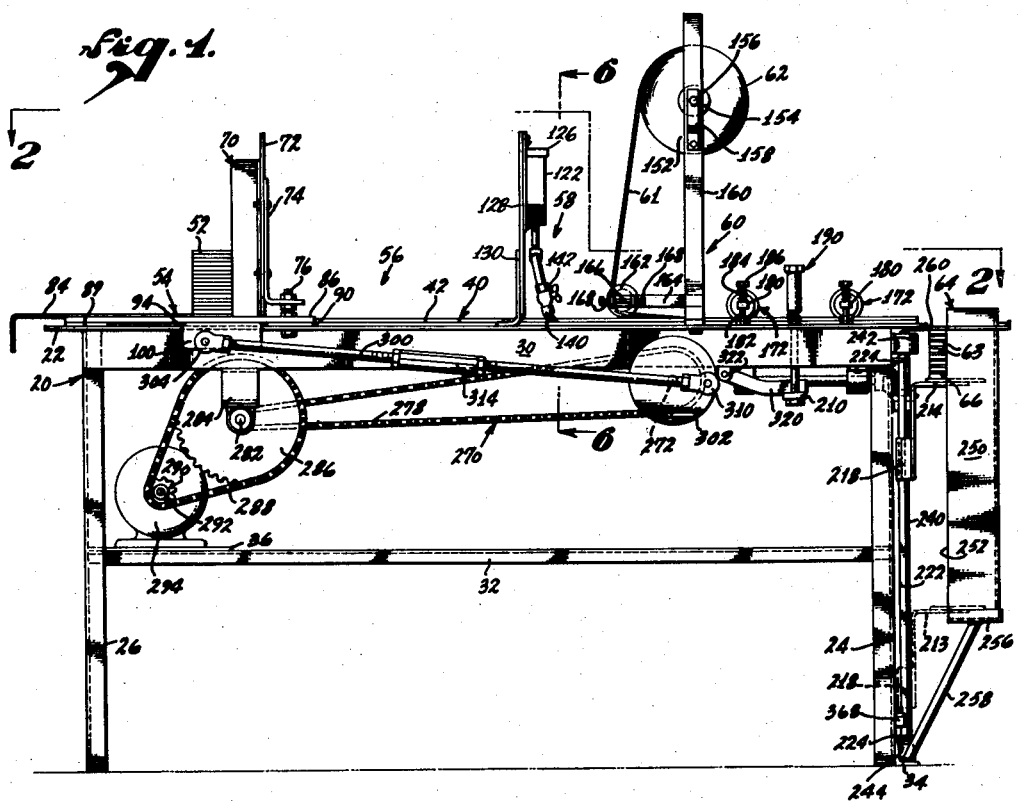
Figure 1 is a side elevational view of automatic machinery embodying our invention.
Figure 2:
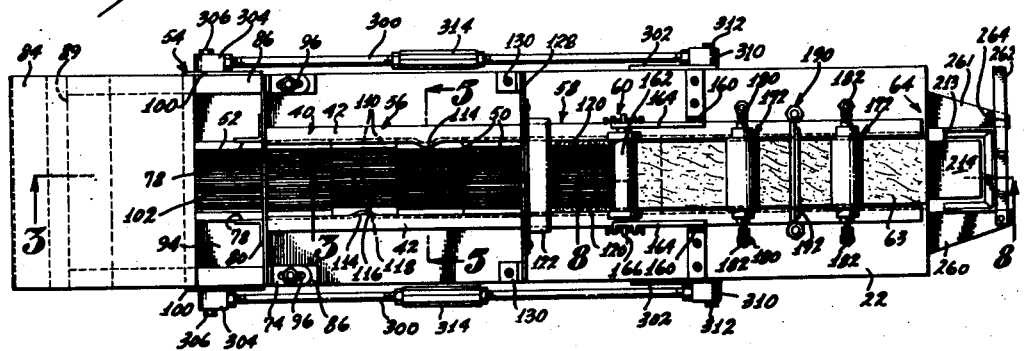
Fig. 2 is a top plan view of this machinery.

Referring to the drawings and particularly to Figs. 1 and 2, there is illustrated a machine for making battery separator units automatically in accordance with our invention. This machine includes a table 20 having a height of about 3½ ft., which table includes an elongated top plate 22 supported by front legs 24 and rear legs 26. The table is reinforced in part by front and rear aprons 28 and 29 and side aprons 30 formed of channel iron and secured to the uppermost ends of the legs 24 and 26 and to the lower surface of the top plate 22. The table is also strengthened by means of forwardly extending horizontal bars 32 connected between the front and rear legs 24 and 26 and a foot bar 34 secured to the lowermost end of the front legs 24 and a motor platform 36 which is mounted on the bars 32 adjacent the rear legs 26.

A track 40 comprising a pair of channelled rails 42 is arranged on the top of the table 20 extending from the front end thereof to a point near the rear end thereof. Each of the rails 42 is formed by means of a top bar 44 mounted upon a spacer bar 46 and offset slightly inwardly therefrom in order to form a channel 48, as indicated more clearly, for example, in Figs. 6 and 10. The track 40 guides a series of rectangular separator plates 50 from a stack 52 in a feeder 54 at the rear end of the track through an inspection stage 56 in which the separator plates are candled and defective plates rejected. The series of separator plates then travels along the track 40 through a gluing stage 58 in which glue is spread on the outer edges of the individual separator plates. The separator plates continue along the track 40 through a forming stage 60 in which a strip 61 of matted fiber glass drawn from a roll 62 is pressed onto them. As the separator plates with the strip of fiber glass secured to them advance further along the track 40, the strip is cut between adjacent edges of the separator plates to form completed separator units 63 having a sheet 65 of fiber glass secured to a separator plate 50, as indicated in Fig. 12. The track 40 then guides the completed separator units 63 into a stacker 64 in which they are piled up in an orderly stack 66. In order to facilitate the guiding of the separator plates 50 from the feeder 54 to the stacker 64, the heights of the channels 48 in the rails 42 are slightly greater than the thickness of the separator plates and the spacing between the two channels is just sufficient to permit the separator plates to be guided in the channels along the track 40 while in a flat position on the top plate 22. Also, the width of the strip 61 of fiber glass is slightly less than the spacing between the tracks 42.

II. The feeder

The feeder 54, which is illustrated in detail in Figs. 3 and 4, includes a chute 70 arranged adjacent the rear end of the track 40 in which the stack 52 of separator plates 50 is arranged. This chute 70 includes a front wall in the form of a transverse plate 72 carried by brackets 74 supported on studs 76 on opposite sides of the top plate 22. The chute 70 also includes two vertical side walls 78 formed by angle irons 80 welded to the front wall 72 in positions in register with the channelled rails 42.

The feeder 54 also includes a shelf 84 for supporting extra stacks of separator plates at the rear end of the table 20. The shelf 84 is supported on the table 20 by two forwardly extending arms 86 welded to the lower side of the shelf and extending forwardly through slots 88 at the lower end of the front wall 72 of the chute 70. The two arms 86 are supported on a transverse bar spacer 89 to which they are attached at the rearmost end and also on short spacers 90 to which they are attached at the front end. These spacers 89 and 90 are of a thickness slightly greater than the thickness of a separate plate 50, in order to provide a working space 92 between the top plate 22 and the shelf 84 in which a pusher plate 94 reciprocates back and forth.

A slot 91 is provided between the lowermost end of the front wall 72 of the chute 70 and the top plate 22 of a height sufficient to permit only a single separator plate to be forced forwardly therethrough into the track 40 by the pusher plate 94 as it moves forward. Preferably, the thickness of the pusher plate 94 is slightly less than the thickness of a separator plate 50 in order that it may engage only the lowermost separator plate in the stack 52 and force it through the slot 91. As the pusher plate 94 is repeatedly reciprocated back and forth in the working space 92, it intermittently forces the bottommost separator plate of the stack 52 through the slot 91 and into the rear end of the track 40 to form the series of separator plates and to advance the series along the track 40. As the series thus advances, it is alternately held stationary in the track 40 and pushed forward along the track by each new separator plate which augments the series.

Longitudinal slots 96 passing through the front ends of the two arms 86 operatively engage the studs 76 to permit forward and rearward adjustment of the position of the front edge 98 of the shelf 84 relative to the stack 52 of separator plates. The pusher plate 94 is provided with downwardly depending aprons 100 which hang over the outer edges of the top plate 22 and accordingly assist in guiding the pusher plate 94 back and forth in the working space 92.

It is to be noted that the separator plates 50 are placed in the stack 52 with their ribs 102 parallel to the track 40 so that corresponding parts of successive separator plates are aligned in the track 40.

III. Inspection

The inspection stage 56 through which the series of separator plates first passes on the track 40 includes a window 104 comprising a light-diffusing glass plate mounted in a rectangular aperture 106 in the top plate 22 directly beneath the track 40. The window 104 is preferably of track width and is of a length about equal to the space occupied by three separator plates in the series. A pair of incandescent lamps 110 are mounted on a bracket 112 directly beneath the window 104. The bracket 112 is preferably of a width slightly less than the window 104 so that it may support the glass plate therein as well as support the lamps 110. Ears 114 formed in the channelled rails 42 project inwardly therefrom, one ear being advanced from the other a distance about equal to the length of a single separator plate 50. Each ear 114 is formed by two concentric segments 116 and 118 welded or otherwise secured to the top bar 44 and the spacer bar 46, respectively, of one channelled rail 42, as indicated in detail in Fig. 5. As the series of separator plates advances through the inspection stage 56, intercepting light transmitted upwardly through the window 104, the edges of the individual separator plates 50 which engage the ears 114 are displaced inwardly of the track 40, causing that separator plate to flex and twist. The flexing and twisting of the separator plates causes cracks therein to become apparent to an inspector watching the plates. Defective separator plates detected in this manner are pulled off the track by means of a hook (not shown) and discarded.

IV. Gluing

The separator plates 50 which pass through the inspection stage 56 then enter the gluing stage 58 in which glue, such as rubber cement dissolved in a volatile component, is applied in bands or lines 120 adjacent the outer edges thereof. For this purpose a gluepot 122 having a tapered bottom 124 and a top cover 126, is mounted upon a vertical plate 128 supported by brackets 130 on the outer sides of the top plate 22, as illustrated particularly in Fig. 6. A downwardly extending center pipe 132 is screwed into the apex 134 at the lowermost end of the gluepot 122.

Two L-shaped pipes 136 are attached to opposite sides of a T-fitting 138 at the lowermost end of the pipe 132. The lowermost ends of these L-shaped pipes carry rubber grip spreaders 140 which contact the separator plates 50 adjacent their outer edges.

The grip spreaders serve to apply glue to the separator plates 50 in the bands 120 as the separator plates pass beneath the spreaders. Valves 142 connected between the grip spreaders 140 and the pipes 136 are employed to regulate the rate at which glue is dispensed to the separator plates. The grip spreaders 140 are in the form of rubber nipples provided with oblique faces 144 which are provided with transverse slits 146, as indicated in detail in Fig. 7. The grip spreaders press slightly against the separator plates in such a manner that the slits 146 close somewhat while the series of separator plates is stationary in the track 40 and open somewhat as the separator plates move forward in frictional engagement with the grip spreaders so as to regulate the flow of glue onto the separator plates.

As the series of separator plates with the adhesive applied thereto advances into the forming stage 60, the strip of fiber glass 61 drawn from the roll 62 is laid flat upon them and pressed onto them. The roll 62 of fiber glass is preferably wound upon a spool 152 which is mounted at opposite ends upon rotatable tapered wood bushings 154. The bushings 154 ride on stub shafts 156 bolted to leaf springs 158 which are fastened to upright arms 160 supported on the top plate 22. The leaf springs 158 press the bushings 154 inwardly into a tapered core hole passing axially through the spool 152 and serve to retard the rotation of the spool 152 as well as support it. An idler roller 162 is rotatably mounted at the ends of two rearwardly extending arms 164 which are attached to the upright arms 160 and extend rearwardly therefrom directly above the top plate 22. The roller 162 is rotatably mounted on a shaft 166 which can be adjustably positioned on the rearwardly extending arms 164 by means of adjusting screws 168. The strip of fiber glass 150 passes behind and beneath the idler roller 162 and is guided into registry with the series of separator plates by means of flanges 170 on the outer ends of the idler roller.

The strip 61 of fiber glass which is led forward beneath the idler roller passes beneath two pressure rollers 172 which serve to press the strip onto the separator plates bearing the bands 120 of glue, as illustrated particularly in Figs. 8 and 9. As the strip 61 of fiber glass is pressed against the series of separator plates, the strip of fiber glass is secured firmly to them and is drawn from the roll 62 by virtue of the tension applied thereto as the separator plates are advanced forwardly in the track.

Each of the pressure rollers 172 comprises a rubber cylinder 174 which is press-fit onto a metal core 176 which rotates on a shaft 178, the outer ends of which terminate in eye-fittings 180 by which the pressure rollers 172 are guided vertically on guide rods 182 in the form of stub bolts which are attached to the top plate 22. Compression springs 184 are arranged between the eye-fittings 180 and nuts 186 threaded onto the upper ends of the guide rods 182 in order to urge the pressure rollers 172 downward firmly against the strip 61 of fiber glass and the separator plates.

V. Cutting

A cutter 190, including a vertically movable blade 192 arranged transversely of the track 40 serves to cut the strip 61 of fiber glass opposite abutting edges 194 of adjacent separator plates between the two rollers 172. Suitable mechanism as described hereinbelow is provided to synchronize the cutting action with the suspension of the forward movement of the series of separator plates on the track 40 so that the strip of fiber glass may be cut while the separator plates are stationary.

Referring particularly to Figs. 8, 9 and 10, it is to be noted that the blade 192 is slightly narrower than the spacing between the rails 42 but is slightly wider than the strip 61 of fiber glass. The blade 192 is supported on a cross arm 196 the ends of which are welded to two sleeves 198 which embrace guide shafts 200 adapted to slide vertically in bearings 202 supported on the side aprons 130. The guide shafts 200 are threaded with top nuts 204 and bottom nuts 206 at their top and bottom ends respectively. A pair of compression springs encircle the guide shafts 200 between the top plate 22 and the sleeves 198, pressing the sleeves against the top nuts 204, and thus serve to urge cutter blade 192 upward away from the table 22 out of contact with the strip 61 of fiber glass which is secured to the separator plates 50. An operating arm 210, having bores 212 which enclose the bottom ends of the guide shafts 200 directly above the lower nuts 206, is employed to force the blade 192 downwardly against the force of compression springs 208 to cut the strip 150 of fiber glass.

After the strip 61 of fiber glass has been cut in the manner explained, in order to form a complete separator unit 63, as illustrated in Fig. 12, this unit is pushed forward beneath the forward roller 172 which serves to secure the severed sheet 65 of fiber glass more firmly to the separator plate 50 to which it is glued. The completed separator plates are pushed off the forward end of the top plate 22 and into the stacker 64.

VI. Stacking

The stacker 64 includes an elevator 213 which is lowered therein synchronously with the advancement of the series of separator plates along the track 40 so that the top of the stack 66 of completed separator units stacked thereon lies just beneath the top plate 22 so that the completed separator unit 63 next discharged from the track is deposited smoothly onto the stack 66.

The elevator 213 is carried on a rearwardly extending bracket 216 which is attached at its lower end to a guide sleeve 218 having a square aperture 220 therein which embraces a vertical guide bar 222 of square cross-section attached to the front end of the table 20 by means of brackets 224, as indicated in detail in Figs. 8 and 11. An ear 226 extending laterally from the guide sleeve 218 serves to pivot the inner ends of two arms 230 and 231 upon which two complementary parts of a splitnut 234 are mounted. A link 236, which is pivotally attached to the outermost end 238 of one of the arms 230, loops over a hook 240 on the outer end of the other arm 231 in order to hold the split nut 234 together in operating position. A lead screw 240 passing through the split nut 234 is employed to lower the elevator 213 in the stacker 64. The lead screw 240 is rotatably supported at its upper end in an open bearing 242 which is secured to the front apron 28; and the lower end of the lead screw 240 rests in a recess of a thrust bearing 244 secured to the foot bar 34 and having its bottom end closed in order to withstand the downward thrust of the lead screw 240.

The stacker 64 also includes an elongated container 250 which is open at its rear side 252 to permit the elevator 213 to be raised and lowered therein and which is open at its upper end 254 to facilitate inspection of the stack 66 of completed separator units 63. The container 250 is supported at its bottom end on a shelf 256 which is attached to the uppermost ends of a pair of upwardly inclined arms 258 which are attached to the foot bar 34. Two arms 260 and 261 are attached to the lower side of the top plate 22 at the front end thereof and extend forwardly therefrom on opposite sides of the container 250 and beyond its front end. A handle 262 pivotally attached to the outermost end of one of these arms 260 is normally held at the outermost end of the other arm 261 by means of a hook 264 at the end of the latter arm in order to prevent the container 250 from falling. The handle 262 is raised over the hook 264 and pulled forwardly in order to remove a stack 66 of separator units when completed. In this operation the container 250 is tilted forwardly as the stack 66 of separator units is pressed against its front wall. A new container 250 is then positioned on the machine and the platform 214 raised to its uppermost position adjacent the top plate 22 from which it may travel downwardly as the separator units are stacked thereon.

VII. Automatic operation

A mechanism 270 interconnecting the feeder 54, the cutter 190, and the elevator 213 is provided to synchronize their operation. This mechanism is arranged beneath the top plate 22 and includes a motor-driven crankshaft 272 which serves to drive the feeder 54, the cutter 190, and the elevator 213. The crankshaft 272 is supported by bearings 274 secured to the side aprons 30. A relatively large sprocket 276 is secured to one end thereof outside the adjacent side apron 30 and is driven by a roller chain 278 which in turn is driven by a small driving sprocket 280 secured to a jack shaft 282 which rotates in hanger bearings 284 depending from the lower sides of the side aprons 30. In turn, a large sprocket 286 is secured to the jack shaft 282 and is driven by another roller chain 288, which in turn is driven by a small sprocket 290 keyed to the shaft 292 of an electric induction motor 294 supported on the platform 36. The sprockets and chains mentioned act as a speed reducer to drive the crankshaft 272 at a relatively low speed compared to the motor shaft 292.

The feeder 54 is operated by means of adjustable connecting rods 300 which are connected at their rear ends to the pusher plate 94 and at their forward ends to crank discs 302 which are secured to the outer ends of the crankshaft 272. More particularly, the rear ends of the connecting rods 300 terminate in eye-fittings 304 which rotatably engage stub shafts in the form of center pins 306 projecting outwardly from the aprons 100 of the pusher plate 94, and the front ends terminate in eye-fittings 310 which rotatably engage crank pins 312 projecting outwardly from the periphery of the crank discs 302. The connecting rods 300 include turnbuckles 314 to facilitate adjustment of the pusher plate 94 relative to the stack 52 of the separator plates. With this arrangement the pusher plate 94 is reciprocated back and forth in the feeder 54 as the crankshaft 272 rotates, thereby forming and advancing the series of separator plates on the track 40.

The cutter 190 is operated by means of a pair of rocker arms 320 which are pivoted on lugs 322 depending from the side aprons 30. The front ends 324 of the rocker arms 320 are welded to the operating bar 210 of the cutter 190 and the rear ends 326 engage the upper surface of a pair of spur cams 328 secured to the crankshaft 272. The rear ends 326 of the rocker arms 320 are held firmly against the spur cams 328 by virtue of the upward pressure exerted by the concentric springs 208 of the cutter acting to lift the guide rods 200 upwardly and to maintain the bottom nuts 206 in positive engagement with the operating bar 210. Each of the spur cams 328 comprises a spur tooth 330 which projects radially therefrom and which engages the rearmost end 326 of the corresponding rocker arms 320 once in each revolution of the crankshaft 272 to force the operating arm 210 downwardly, thus cutting the strip 150 of fiber glass. The spur teeth 330 are so oriented on the crankshaft 272 relative to the positions of the crank pins 312 that the blade 192 is forced downwardly to cut the strip 150 of fiber glass while the series of separator plates is held stationary on the track 40.

The elevator 213 is lowered continuously during the advancement of the series of separator plates along the track 40 by means of gearing 334 which interconnects the crankshaft 272 and the lead screw 240, as illustrated in Fig. 8. This gearing 334 includes a longitudinally extending shaft 336 which rotates in bearings 338 supported on one of the side aprons. The shaft 336 carries a bevelled gear 340 at its rear end which meshes with a bevelled gear 342 secured to the crankshaft 272. It also includes a bevelled gear 344 secured to its forward end which meshes with a bevelled gear 346 secured to the lead screw 240. With this arrangement the platform 214 of the elevator is lowered continuously as the crankshaft 272 rotates.

VIII. Control circuit

The circuit which is employed to control the battery separator unit-making machine described above is illustrated in Fig. 12 and includes a relay 350 employing a pair of normally open power contacts 352, a normally open sticking contact 354, and a solenoid 356. The power contacts 352 are included in lines 358 which connect the electric motor 240 to the power mains 360. A push-button-type normally-open start-switch 362 is included in one of the lines 364 which connect the solenoid 356 with the power mains 360. The sticking contacts 352, a push-button-type normally-closed stop-switch 366, and an automatic stop-switch 368 are arranged in series in a sticking circuit 369 which shunts the start-switch 362. The automatic stop-switch 368 is preferably in the form of a microswitch which is attached near the lowermost end of one of the front table legs 24 adjacent the guide bar 222, as indicated in Fig. 1, and is arranged to be opened when contacted by the guide sleeve 218 which carries the elevator platform 214 so that the machine is stopped automatically when the elevator platform reaches its lowermost position. The inspection lights 110 are connected by lines 370 to the power mains 360 and are controlled by means of a manually operated single-throw double-pole switch 372.

In order to commence operation of the machine after the feeder 54 is loaded with a stack 52 of separator plates, the push-button start-switch 362 is depressed to operate it, thereby energizing the solenoid 356 and closing the power contacts 352 and 354. The closing of the power contacts 352 energizes the motor 240, starting the operation of the machine. The closing of the sticking contact 354 completes the sticking circuit 369, shunting the start-switch 362 and maintaining the solenoid 356 energized even when the start-switch 362 is released. As the series of separator plates is formed on the track 40 by intermittent feeding of separator plates thereto from the stack 52 by the operation of the pusher plate 94, a strip of fiber glass drawn from the roll 62 is secured thereto by being fed beneath the rear pressure rollers 172, and is cut by the cutter 190 in the manner explained to form the complete separator units and the completed separator units are deposited in the stacker 64, the operation continuing automatically.

As the forming of the completed separator units continues, the elevator platform 214 is gradually lowered in the stacker 64, finally reaching its lowermost position where it opens the switch 368, restoring it, thereby deenergizing the solenoid 356, releasing the power contacts 352, and discontinuing the operation of the machine. If at any time while the machine is operating it is desired to stop the machine, it is only necessary to depress the stop-switch 366 to restore it, similarly opening the sticking circuit 369 and stopping the machine.

IX. Summary

From the foregoing description of our invention, it is clear that we have provided a novel method by means of which battery separator units may be manufactured efficiently and at low cost. Although separator units employing sheets of fiber glass have long been used and although it has long been known that strips of fiber glass are less expensive than sheets of fiber glass, as far as we know we are the first to develop a system for manufacturing separator units with such rolls. While we have described our invention with particular reference to the manufacture of battery separator units employing ribbed wood separator plates and fiber glass, it is to be understood, of course, that our system is applicable to the manufacture of battery separator units from other kinds of materials. In particular, for example, wood separator plates could be replaced by separator plates composed of microporous rubber and the strip of matted fiber glass could be replaced by a strip of other porous sheet material, particularly matted fibrous material, which is of high porosity and of high acid resistance.

Although only one particular form of the invention has been specifically disclosed, it will be obvious that the invention is not limited thereto but is capable of a wide variety of mechanical embodiments. Various changes, which will suggest themselves to those skilled in the art now and later, may be made in the form, details of construction, and arrangement of the elements without departing from the spirit of the invention. Reference is, therefore, to be had to the appended claim for a definition of the limits of the invention.

We claim as our invention:

In apparatus for manufacturing battery separator units, each of which comprises a layer of porous material and a separator plate, the combination of: a straight track for guiding a series of such separator plates along a predetermined path, means operatively arranged adjacent said track for advancing a series of such plates along said track, a window in said track comprising a flat light-diffusing plate, and a light disposed adjacent said window whereby said separator plates intercept light passing through said window as they advance along said track, means projecting inwardly of said track adjacent said window for engaging said plates at their edges to flex said plates as they pass said window whereby flaws therein become apparent.

RALPH C. MANN.
WILLIAM H. ASHCRAFT.

REFERENCES CITED

The following references are of record in the file of this patent:

UNITED STATES PATENTS

| Number | Name | Date |
| --- | --- | --- |
| 200,307 | Jaeger | Feb. 12, 1878 |
| 877,490 | Davis | Jan. 28, 1908 |
| 1,792,986 | Huye | Feb. 17, 1931 |
| 1,948,087 | Aberson | Feb. 20, 1934 |
| 1,965,819 | Allen | July 10, 1934 |
| 2,228,887 | Peterson | Jan. 14, 1941 |
| 2,254,394 | Ratley | Sept. 2, 1941 |
| 2,282,245 | Ratley | May 5, 1942 |
| 2,373,082 | Staelin | Apr. 3, 1945 |
| 2,406,489 | Case | Aug. 27, 1946 |